US012699074B2

(12) United States Patent
Lim et al.

(10) Patent No.: US 12,699,074 B2
(45) Date of Patent: Aug. 4, 2026

(54) ROBOTIC NON-DESTRUCTIVE TESTING PROBE MOUNT

(71) Applicant: Rohr, Inc., Chula Vista, CA (US)

(72) Inventors: Ee Hwee Lim, Singapore (SG); Pravin Ishwardas Rajwani, Singapore (SG); Ann Soon Anson Tan, Singapore (SG)

(73) Assignee: ROHR, INC., Chula Vista, CA (US)

( * ) Notice: Subject to any disclaimer, the term of this patent is extended or adjusted under 35 U.S.C. 154(b) by 235 days.

(21) Appl. No.: 18/402,574

(22) Filed: Jan. 2, 2024

(65) Prior Publication Data

US 2024/0255470 A1 Aug. 1, 2024

(30) Foreign Application Priority Data

Jan. 31, 2023 (EP) .................................... 23154284

(51) Int. Cl.
  *G01N 29/265* (2006.01)
  *G01N 29/22* (2006.01)
(52) U.S. Cl.
  CPC ......... *G01N 29/265* (2013.01); *G01N 29/223* (2013.01)
(58) Field of Classification Search
  CPC .... G01N 29/265; G01N 29/223; G01N 29/04; G01N 29/28; G01N 29/225
  USPC ......................................................... 73/584
  See application file for complete search history.

(56) References Cited

U.S. PATENT DOCUMENTS

| | | | |
|---|---|---|---|
| 4,680,969 A | 7/1987 | Hama et al. | |
| 5,280,724 A | 1/1994 | Higo et al. | |
| 8,365,584 B1 | 2/2013 | Quinones et al. | |
| 9,834,323 B2 | 12/2017 | Georgeson et al. | |
| 2005/0126316 A1* | 6/2005 | Richter ................ | G01N 29/043 |
| | | | 73/866.5 |
| 2018/0306749 A1* | 10/2018 | Ruttanasupa ........... | G01M 3/40 |
| 2020/0172184 A1* | 6/2020 | Abdellatif ............ | G05D 1/0094 |
| 2021/0060783 A1 | 3/2021 | Bryner et al. | |
| 2024/0255471 A1* | 8/2024 | David .................... | G01N 29/07 |
| 2025/0146980 A1* | 5/2025 | Nogues ................ | G01N 29/265 |

OTHER PUBLICATIONS

European Patent Office; European Search Report dated Jul. 21, 2023 in Application No. 23154284.6.

* cited by examiner

*Primary Examiner* — Marrit Eyassu
(74) *Attorney, Agent, or Firm* — SNELL & WILMER L.L.P

(57) ABSTRACT

An apparatus for non-destructive testing of a component is disclosed herein. The apparatus comprises a robotic arm, a probe holder, a probe connected to the robotic arm via the probe holder, and a controller configured to move the robotic arm to move the probe over a surface of a component to be tested. The probe holder comprises a spring assembly for biasing the probe towards the surface of the component to be tested to keep the probe in contact therewith. The spring assembly comprises at least one pair of spring portions that are spaced apart along a first axis.

7 Claims, 7 Drawing Sheets a)

b)

c)

ROBOTIC NON-DESTRUCTIVE TESTING PROBE MOUNT

CROSS-REFERENCE TO RELATED APPLICATIONS

This application claims priority to, and the benefit of, European Patent Application No. EP23154284.6, filed Jan. 31, 2023 and titled "ROBOTIC NON-DESTRUCTIVE TESTING PROBE MOUNT," which is incorporated by reference herein in its entirety for all purposes.

FIELD

The technology described herein relates generally to non-destructive testing ("NDT") using robotic arms. In particular, described herein is an apparatus for non-destructive testing of a component, and a probe holder for holding a probe during non-destructive testing of a component.

BACKGROUND

Non-destructive testing is an integral part of the assessment of quality and structural integrity in engineering components pre- and post-repair. In particular, non-destructive testing is often used for inspecting engineering components such as composite bonded panels, for example for use in aircraft applications. A suitable probe, for example an ultrasonic probe, is moved across a surface of a component to be tested in order to test the component in multiple locations.

Traditionally, non-destructive testing has been performed manually, with a user scanning a probe over a component to be tested. However, it is increasingly desirable to automate this procedure, in which case the probe may be mounted on the end of a robotic arm, such that the non-destructive testing can be performed in a collaborative human-robot ("cobot") or in a fully automated manner.

The Applicants however believe there remains scope for improved apparatus for such non-destructive testing.

SUMMARY

A first embodiment of the technology described herein comprises an apparatus for non-destructive testing of a component, the apparatus comprising: a robotic arm, a probe holder, a probe connected to the robotic arm via the probe holder, and a controller configured to move the robotic arm to move the probe over a surface of a component to be tested. The probe holder comprises a spring assembly for biasing the probe towards the surface of the component to be tested to keep the probe in contact therewith. The spring assembly comprises at least one pair of spring portions that are spaced apart along a first axis, the spring assembly configured such that when the probe is moved over the surface of the component to be tested in a direction parallel to the first axis, the pair of spring portions that are spaced apart along the first axis maintain the probe in a certain orientation relative to the surface of the component.

The technology described herein also extends to the novel form of the probe holder itself. A second embodiment of the technology described herein comprises a probe holder for holding a probe during non-destructive testing of a component, the probe holder comprising a spring assembly for biasing the probe in use towards a surface of a component to be tested to keep the probe in contact therewith. The spring assembly comprises at least one pair of spring portions spaced apart along a first axis, the pair of spring portions configured such that in use when a probe held therein is moved over the surface of the component to be tested in a direction parallel to the first axis, the pair of spring portions maintain the probe in a certain orientation relative to the surface of a component to be tested.

According to the above arrangements, a probe holder is used to connect a probe for non-destructive testing to a robotic arm. The probe holder includes a spring assembly arranged to maintain the probe in a certain orientation, relative to the surface of a component to be tested as the probe is moved across the surface, for example with a lower surface of the probe parallel to the surface of the component to be tested (or, correspondingly, such that the probing direction is essentially normal to the surface of the component to be tested). The spring assembly in particular comprises at least one pair of spring portions that are spaced apart along a first axis (in a first direction). The effect of this is therefore that when the probe is moved over the surface of a component to be tested in a direction parallel to the first axis, the pair of spring portions that are spaced apart along the first axis effectively act to convert vertical deviations in the surface into bending moments, which are then compensated by the spaced apart spring portions accordingly, to thereby maintain the probe in a certain orientation relative to the surface of the component.

This then provides a reliable means of maintaining a desired probe orientation in use, as the probe is moved over the surface of the component to be tested, that can advantageously be used with existing (off-the-shelf) robotic arm technology, e.g., and in embodiments, without requiring modification of the robotic arm, such as by introducing additional sensors or a finer grained control, and without requiring more complex control software. As such, this provides a simpler and relatively more easily produced arrangement that allows existing robot systems to be used on components having more complex surface geometry with improved accuracy.

For example, traditional robotic arm system may include a force sensor for detecting contact with the surface of the component to be tested. However, compared to manual testing, there is less mechanical feedback, and in particular it is difficult to reliably maintain the probe in a certain orientation. For instance, for complex surfaces, a force sensor may indicate that the probe is in contact with part of the surface, but does nothing to ensure the probe is correctly aligned. This can therefore introduce errors into the measurement, or in some cases make meaningful measurements impossible. Furthermore, the robotic arm is typically moved according to a certain, e.g. predetermined, scanning pattern, which is necessarily designed for idealized, e.g. symmetrical surfaces, without considering more complicated curved surfaces or surface distortions that mean the surface deviates from the idealized surface for which the scanning pattern was designed. Again, therefore, this means that testing of such surfaces may be unreliable. The technology described herein thus advantageously allows such available robotic arms and scanning patterns to be used for more complex surfaces with increased reliability by providing a mechanical compensation in the form of the spring assembly that acts to maintain the probe in a desired orientation, as will be explained further below.

The probe may be any suitable and desired probe that may be used for non-destructive testing. In an embodiment the probe is an ultrasonic probe. However, it could also be an optical probe, an electromagnetic probe, or any other probe where it is important to maintain a desired surface orientation.

Subject to the requirements of the technology described herein the spring assembly may take any suitable and desired form.

In embodiments, the at least one pair of spring portions comprises a pair of c-shaped springs. These may also be referred to as "earlobe" springs. It will be appreciated that a c-shaped spring will have an open section and a curved section (that define the "c" shape). In embodiments, the pair of spring portions are arranged with the open sections of the respective c-shapes facing each other. In this way, the pair of spring portions may define an essentially symmetrical spring arrangement (when the spring assembly is unloaded).

In embodiments, at least one of the c-shaped springs comprises a cut-out portion. In particular, the curved section of at least one of the c-shaped springs further may comprise a cut-out portion. Such an arrangement may increase flexibility of the cut-out portion whilst further reducing the weight of the probe holder.

In embodiments, the probe holder comprises a plurality of probe holder parts including a first probe holder part and a second probe holder part, wherein the probe holder parts are configured to hold the probe therebetween in use. In embodiments, the probe holder comprises only the first and second probe holder parts.

Each probe holder part may comprise a respective pair of spring portions spaced apart along the first axis. The probe holder parts may thus provide two parallel pairs of spring portions. In embodiments, the first and second probe parts are spaced apart in a second direction perpendicular to the first axis. That is, in embodiments, the first and second parts are brought together around the probe in the second direction, to substantially enclose and/or hold the probe in use. In this way, the probe holder may also be able to accommodate a degree of surface deviation in the second direction as well, thereby allowing the probe holder to maintain a certain orientation with respect to the surface of the component when the probe holder is moved in a direction parallel to the second axis. In this way, the probe holder can better maintain the probe in its desired orientation independently of the direction the probe is moved across the surface of the component.

A connecting tab may be provided that connects between the first and second probe holder parts. The connecting tab may be, and in embodiments is, provided on one of the first and second probe holder parts and designed to fit into a corresponding slot on the other of the first and second probe holder parts.

In embodiments, each of the first and second probe holder parts comprises an upper portion for connection to the robotic arm and a lower portion arranged to support the probe, wherein the respective pairs of spring portions for each of the first and second probe holder parts connect between the respective upper and lower portions of the first and second probe holder parts. The spring portions thus effectively decouple the orientation of the upper portion with respect to the surface of the component from the orientation of the lower portion with respect to the surface of the component.

In embodiments, at least the upper surface, lower surface and pair of spring portions are integrally formed. This may simplify the manufacture of the probe holder.

The upper portion and lower portion may define respective upper and lower surfaces that are essentially parallel to one another in an unloaded condition, with the spring portions connecting between them. In embodiments, at least the upper surface, lower surface and pair of spring portions are integrally formed. This may simplify the manufacture of the probe holder.

Other arrangements would however be possible and in general the probe holder parts may take any suitable and desired form.

In embodiments, each probe holder part is integrally formed. This allows simple manufacturing techniques, such as 3D printing, to be used to form the respective probe holder parts. Furthermore, the provision of the probe holder part as a single unit, without separate moving parts, allows the probe holder to be produced more simply and to be more reliable in use.

However, various other arrangements would be possible. For example, the probe holder may in other embodiments comprise a single part, that may be integrally formed, with a suitable cavity for holding the probe.

In embodiments, the probe holder may be made from plastic. This may further beneficially save weight and reduce cost of the probe holder.

In an embodiment, the robotic arm comprises an end effector, wherein the end effector comprises first and second holding elements configured to be moveable towards one another, wherein the first probe holder part is removably connected to the first holding element and the second probe holder part is removably connected to the second holding element, such that when the first holding element and second holding element of the end effector are moved towards one another, the first probe holder part and second probe holder part are moved together to hold the probe. Such an end effector, which could be, and in embodiment is, a gripper, allows the first and second probe holder parts to be moved towards one another to hold a probe, thereby allowing the probe holder parts to together hold a probe without moving parts on the probe holder parts, simplifying the design and construction of the probe holder parts. In an embodiment, the first probe holder part and the second holder part each comprise a connector, wherein the connectors are arranged to allow the first probe holder part and the second probe holder part to be connected to a respective holding element of the end effector. In embodiments, the connector is a connection hole arranged to receive a bolt or screw to connect the first and second probe holder parts to a respective one of the holding elements. The probe holder (parts) may thus be designed for connection to existing robotic end effectors. This therefore allows a more secure holding of the probe on the end of the robotic arm (e.g. compared to having the end effector grab the probe directly).

The technology described herein may therefore provide various benefits compared to other more conventional approaches.

Subject to the requirements of the technology described herein, the apparatus may comprise any suitable and desired features that a non-destructive apparatus may contain.

Various other arrangements would of course be possible.

BRIEF DESCRIPTION OF THE DRAWINGS

A number of embodiments and examples will now be described to illustrate the technology described herein with reference to the following figures in which.

Like reference numerals are used for like components where appropriate in the Figures.

DETAILED DESCRIPTION

The technology described herein generally relates to non-destructive testing ("NDT") using robotic arms.

Figure 1:
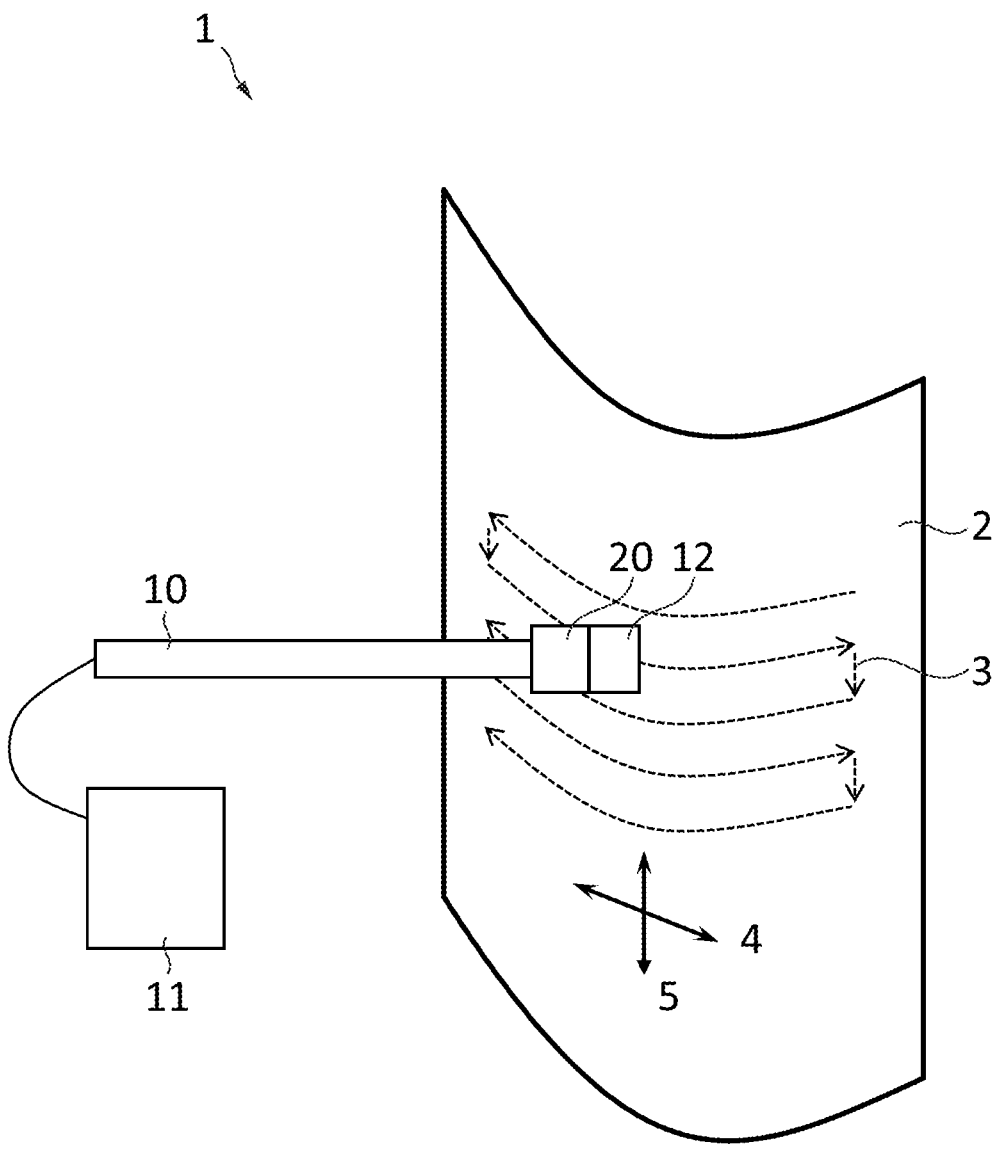
FIG. 1 shows a schematic of an apparatus in accordance with an embodiment.

FIG. 1 shows an apparatus 1 for non-destructive testing of a component 2 in accordance with an embodiment. The component 2 may be any suitable component for non-destructive testing. For example, the component 2 may be a composite panel, such as a composite sandwich panel.

Non-destructive testing of the component 2, is performed by moving a probe 12 over the surface of the component 2. The probe 12 may be any suitable probe for non-destructive testing. In an embodiment the probe 12 is an ultrasonic probe. One example of a suitable probe is an Olympus S-PC-P14 ultrasonic probe, however any other suitable probe for non-destructive testing may be used. For example, and in embodiments, the probe may be an optical probe or an electromagnetic probe.

The probe 12 is scanned over the surface of the component 2 using a robotic arm 10. The robotic arm 10 may be any suitable robotic arm. In some embodiments, the robotic arm is part of a collaborative human-robot ("cobot") system. In other embodiments the robotic arm is part of a fully-autonomous robot system. For brevity, any references to a robot system herein also include such "cobot" systems.

The robotic arm 10 is controlled by a controller 11. The controller 11 may be any suitable controller for controlling a robotic arm. In embodiments, the controller 11 is an integrated part of a robot system including the robotic arm 10. In other embodiments, the controller is comprised in a computer, such as a laptop computer, connectable to the robotic arm 10. The controller 11 is configured to move the robotic arm 10 over a surface of a component to be tested. In embodiments, the controller 11 is configured to move the robotic arm 10 to move the probe 12 over the surface according to a certain scanning pattern 3 as set by the controller. The scanning pattern 3 could be, and in an embodiment is, a fixed scanning pattern for all components of a certain type. In other embodiments, the scanning pattern 3 is determined by the controller. For example, the controller 11 may be arranged to determine the scanning pattern 3 for the component 2, for example based on an operator setting boundary points on the surface and scanning parameters (such as speed and offset).

In embodiments, the scanning pattern 3 has a first direction 4, along which the probe 12 is primarily moved in both a forward and a reverse direction to perform non-destructive testing, and a second direction 5 perpendicular to the first direction 4, along which the probe 12 is moved a short distance between respective scans in the first direction 4.

When performing non-destructive testing, it is often necessary to ensure that the probe 12 constantly makes good contact with the surface of the component 2 to be tested. Furthermore, it may also be necessary to ensure that the probe 12 is maintained in a certain desired orientation, e.g. such that a lower surface of the probe 12 is maintained parallel to the surface of the component 2 to be tested.

An example of this is shown in FIG. 2. In FIG. 2, the component 2 is a composite sandwich panel, comprising an inner layer 2*b* sandwiched between two outer layers 2*a*.

Figure 2A:
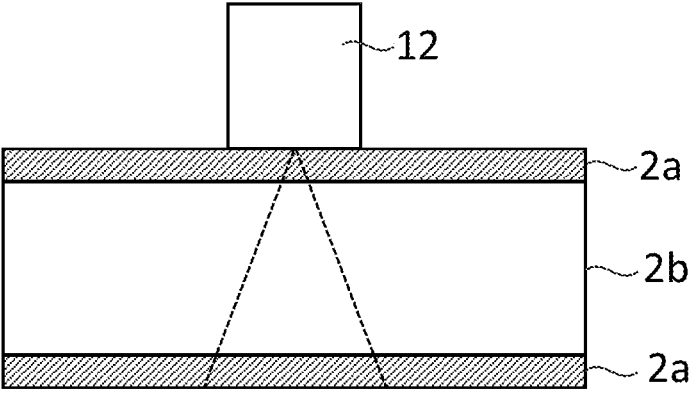
FIGS. 2A and 2B show schematically a probe for non-destructive testing in different orientations with respect to a surface of a component to be tested.
Figure 2B:
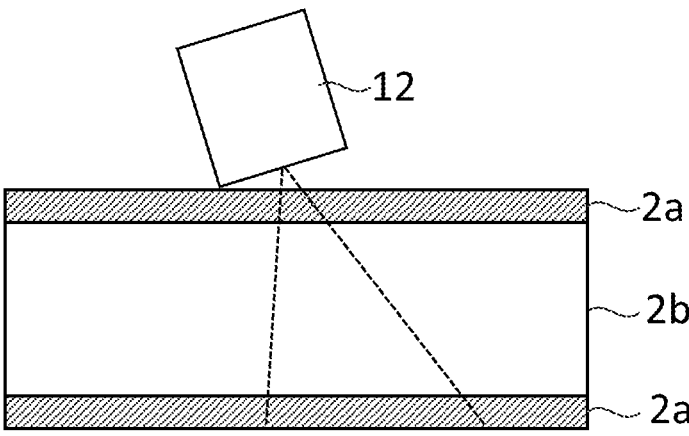

In FIG. 2A, a probe 12 is shown in parallel contact with the surface of the component 2. The signal from the probe follows an intended path in accordance with previous calibration measurements. In FIG. 2B, the probe 12 is not parallel to the surface of the component 2. This means that the signal from the probe deviates from the intended path seen in calibration measurements, which may lead to inaccurate testing.

To aid with this, the robotic arm 10 may and in an embodiment does, comprise a force sensor, for example an embedded force-torque sensor, which allows the controller 11 to detect when the probe 12 is in contact with the surface of the component to be tested.

In many cases, the surface of the component is curved. The controller 11 may be, and in an embodiment is, configured to compensate for simple curvature when preparing a scanning pattern. However, real components may have more complex curvature, or surface deviations, such that the controller 11 cannot reliably maintain the probe 12 in parallel contact with the surface.

It would be possible include additional sensors in the robotic arm 10, or introduce more complicated scanning pattern software to the controller 11. However, this may require substantial modification of the robot system, which may lead to substantial costs.

Figure 3:
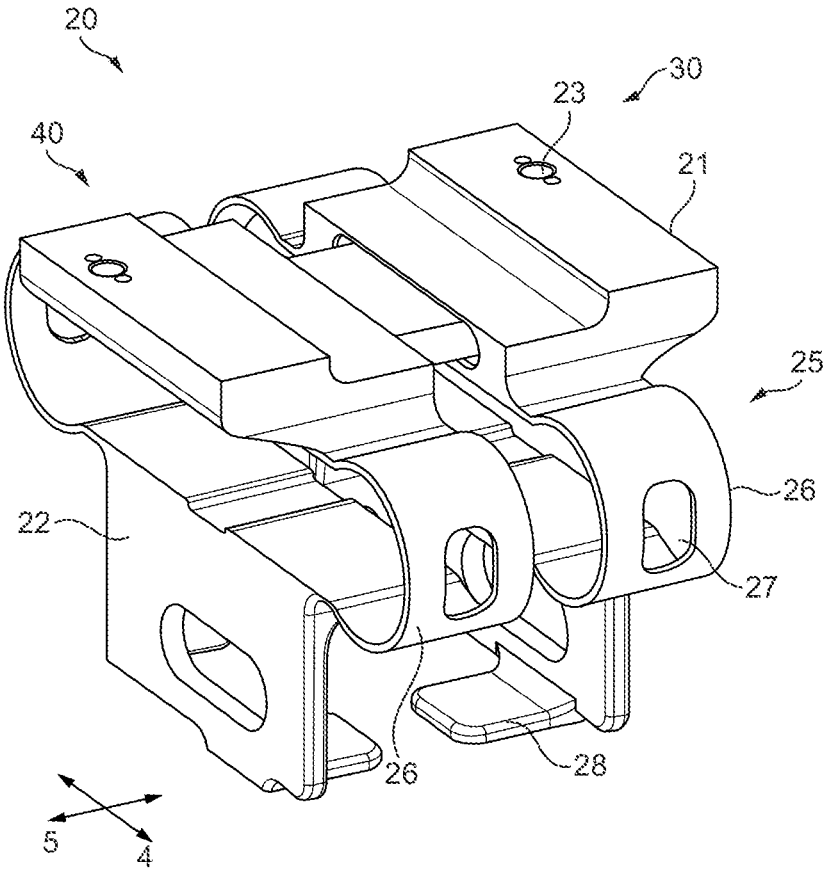
FIG. 3 shows a probe holder in accordance with an embodiment.

According to the technology described herein, a probe holder 20 is releasably connected to the robotic arm to hold the probe 12 and to help in maintaining the desired probe orientation. A probe holder 20 according to an embodiment is shown in FIG. 3.

In embodiments, the probe holder 20 comprises at least one upper portion 21, connected in use to the robotic arm 10. In embodiments, the upper portion 21 is releasably connected to the robotic arm 10. In embodiments, the upper portion 21 is connected to the robotic arm 10 via a screw or bolt, that may be inserted into a connection hole 23. However, any other suitable arrangement may be used. For example, and in an embodiment, the upper portion 21 may comprise a groove, ridge or tab configured to interact with a corresponding tab, groove or ridge on the robotic arm 10.

In embodiments, the probe holder 20 further comprises a lower portion 22 that holds the probe 12. The probe 12 may be held in any suitable way. For example, and in an embodiment, the lower portion 22 may be shaped such that a probe 12 can be press-fit into the lower portion 22. Alternatively, the lower portion 22 may comprise a moveable connector such as a strap, clip or other suitable connector, which may be used to hold, or to assist in holding, the probe 12.

In an embodiment, the probe holder 20 comprises a first probe holder part 30 and a second probe holder part 40, as will be discussed in more detail below. In embodiments, the probe 12 is held between the first holder part 30 and the second probe holder part 40, as will be discussed in more detail below.

In embodiments, the lower portion 22 comprises one or more support tabs 28, arranged to sit underneath a probe 12. The support tab 28 further ensures the probe 12 is stably held in the probe holder 20, thereby ensuring reliable and consistent non-destructive testing results.

The probe holder 20 comprises a spring assembly 25 for biasing a probe towards the surface of a component 2 to be tested to keep the probe 12 in contact therewith. The spring assembly 25 comprises at least a pair of spring portions 26, spaced apart along a first axis. The spring portions may connect the upper portion 21 and the lower portion 22 of the probe holder 20. In embodiments, the probe holder 20 is arranged such that, in use, the first axis is aligned with the primary direction 4 of the scanning pattern.

The spring assembly 25 is configured such that when the probe 12 is moved in a direction parallel to the first axis, the pair of spring portions 26 maintain the probe 12 in a certain orientation relative to the surface of the component 2. In particular, in embodiments, the spacing of the spring portions 26 along the first axis allow for the spring portions 26 to act together to decouple the motion of the lower portion 22 of the probe holder 20, and therefore of a probe 12, from that of the upper portion 21 of the probe holder 20, and therefore the robotic arm 10, thereby maintaining the probe in the certain orientation. In embodiments, the certain orientation is such that in use, a lower surface of the probe 12 is maintained parallel to the surface of the component 2.

Such a probe holder 12 provides a simple means of maintaining in a certain, desired, orientation relative to the surface of even more complex components, without requiring substantial modification of the robotic arm 10 or controller 11, thereby allowing cheaper "off-the shelf" robotic systems to be used for non-destructive testing of a greater range of components.

In embodiments, the at least two spring portions 26 comprise a pair of c-shaped springs that are spaced apart along the first axis. The c-shaped springs have an open section and a curved section (that define the "c" shape). In embodiments, the curved sections of the c-shaped springs may have a single curvature, extending from the lower portion 22 to the upper portion 21 of the probe holder 20, or may have a more complex curvature, for example extending upwards from a point, for example a lowest point, on the upper portion 21 and/or downwards from a point, for example a highest point, on the lower portion 22, with a curve extending between these two extensions. This increases the curvature of the spring portion 26, which may allow for a greater amount of energy to be stored in the spring, thereby providing improved ability to maintain the particular orientation.

In embodiments the c-shaped springs of the pair of c-shaped springs face in opposite directions. In embodiments, the pair of spring portions are arranged with the open sections of the respective c-shapes facing each other, such that, in an unloaded condition, the pair of spring portions 26 may define an essentially symmetrical spring arrangement.

In embodiments at least one of the c-shaped springs further comprises a cut-out portion 27, where part of the c-shaped spring comprises a hole. In embodiments, each of the c-shaped springs comprises such a cut-out portion 27. The cut-out portions 27 may increase the flexibility of the c-shaped springs, thereby providing improved ability to maintain the particular orientation, and may help reduce the weight and cost of the probe holder 20.

Figure 4:
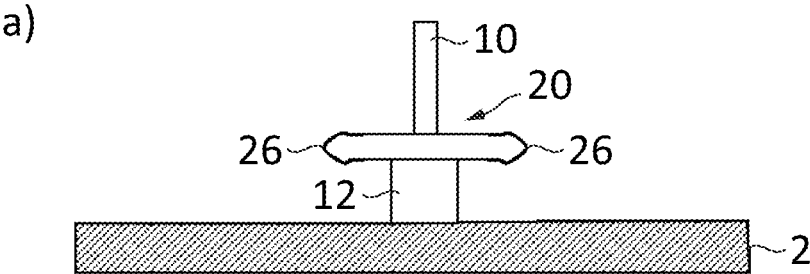
FIG. 4 shows schematically an apparatus in accordance with an embodiment positioned in three locations on a surface to be tested.
Figure 4:
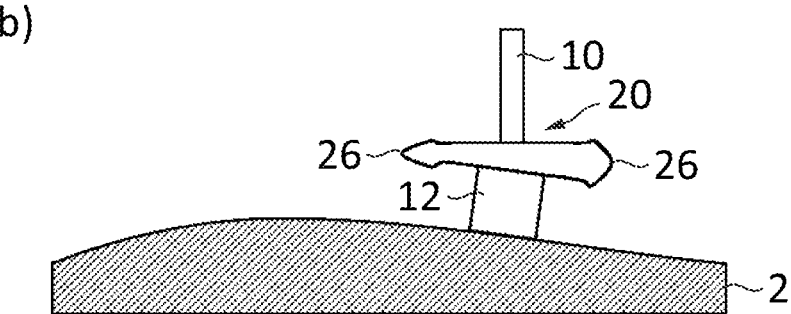
Figure 4:
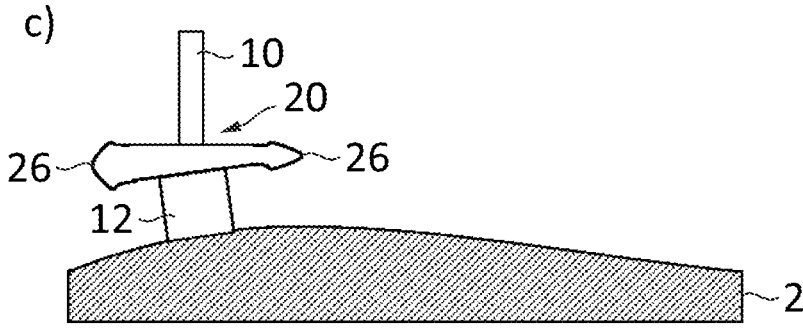
Figure 4:

The action of the spring assembly 25 is illustrated schematically in FIG. 4.

In FIG. 4a, the robotic arm 10, and the probe 12 mounted thereon, is being moved in the first direction 4 along a flat surface of a component 2. In an embodiment, the controller 11 may be arranged to move the robotic arm 10 towards the surface of the component 2, until contact with the surface is made, for example as detected by a force sensor in the robotic arm 10. Such an arrangement may allow the controller 11 to ensure that the probe 12 maintains contact with the surface at all times. Alternatively, the controller may be arranged to position the probe 12 at a set location, for example a pre-determined location. In arrangements where the relative positions of the component 2 and the robotic arm 10 are well-defined, this may simplify the operation of the controller 11.

As the robotic arm 10, is moved towards the surface of the component 2, the spring portions 26 of the spring assembly compress. On a flat surface, spring portions 26 spaced apart along the first axis compress equally, such that the probe 12 is maintained in a particular, in embodiment desired, orientation, for example and in an embodiment such that the lower surface of the probe 12 is parallel to the surface of the component 2.

It will be appreciated that whilst the robotic arm 10 of FIG. 4 is shown schematically as moving parallel to a single direction, the robotic arm 10 may move along a more complex, for example curved, path. However, many controllers 11 for robotic arms 10 are only capable of dealing with single curvature, and so are not able to adjust a robotic arm 10 to deal with more complex surfaces of real components. In such cases, the spring assembly 25 of the probe holder 20, allows a desired orientation between the surface of a component 2 and the probe 12 to be maintained even for components having more complex curvatures.

For example, the surface of the component 2 of FIGS. 4b and 4c has a complex curvature. FIGS. 4b and 4c illustrate schematically how the probe holder 20 can maintain a probe 12 having a particular orientation with respect to the surface of the component 2, even when the robotic arm 10 is not able to maintain a particular orientation with respect to the surface of the component. In each of FIGS. 4b and 4c, a spring portion 26 on one side of the probe holder 20 is compressed more than a spring portion 26 on a second side of the probe holder 20, thereby allowing the probe 12 to be maintained in the particular orientation with respect to the surface of the component 2.

As discussed above, in embodiments the probe holder 20 may comprise a first probe holder part 30 and a second probe holder part 40. In an embodiment, each of the first and second probe holder parts comprises at least one of the spring portions 26. In an embodiment, each of the first and second probe holder parts comprises a respective pair of spring portions 26 spaced apart along the first axis.

In embodiments, the spring portions 26 of the first probe holder part 30 and the spring portions 26 of the second probe holder part are spaced apart along a second axis, different to the first axis. For example, the spring portions 26 of the first probe holder part 30 may be spaced from the spring portions 26 of the second probe holder part 40 along an axis parallel to the second direction 5. In embodiments, the first and second probe holder parts are spaced apart in the second direction perpendicular to the first axis.

In such cases, providing first and second probe holder parts with spring portions spaced along a second direction, may allow the spring assembly 25 of the probe holder 20 with to also compensate for deviations in the second direction. As such, the probe holder 20 can ensure that the probe 12 can be maintained in the particular orientation with respect to the surface independent of the direction of movement of the probe 12 along the surface of the component 2.

In embodiments, each of the first probe holder part 30 and the second probe holder part 40 is integrally formed. This allows the probe holder 20 to be manufactured using simple techniques, such as 3D printing, and to contain few or no moving parts, such that the probe holder 20 is reliable in service.

In other embodiments, the whole of the probe holder 20, including both the first probe holder part 30, and second holder part 40, is integrally formed. In such embodiments, the probe holder 20 may be arranged such that the probe can be press-fit or otherwise held between the first and second probe holder parts without relative movement thereof.

In some embodiments, the probe holder 20 is made from plastic, for example, and in an embodiment, from ABS. This allows the probe holder 20 to be light, such that it does not significantly affect the weight at the end of, and so the motion of, the robotic arm 10. Use of plastic also ensures that the probe holder 20 is cheap, and that it can be made using simple techniques such as 3D printing.

Figure 5:
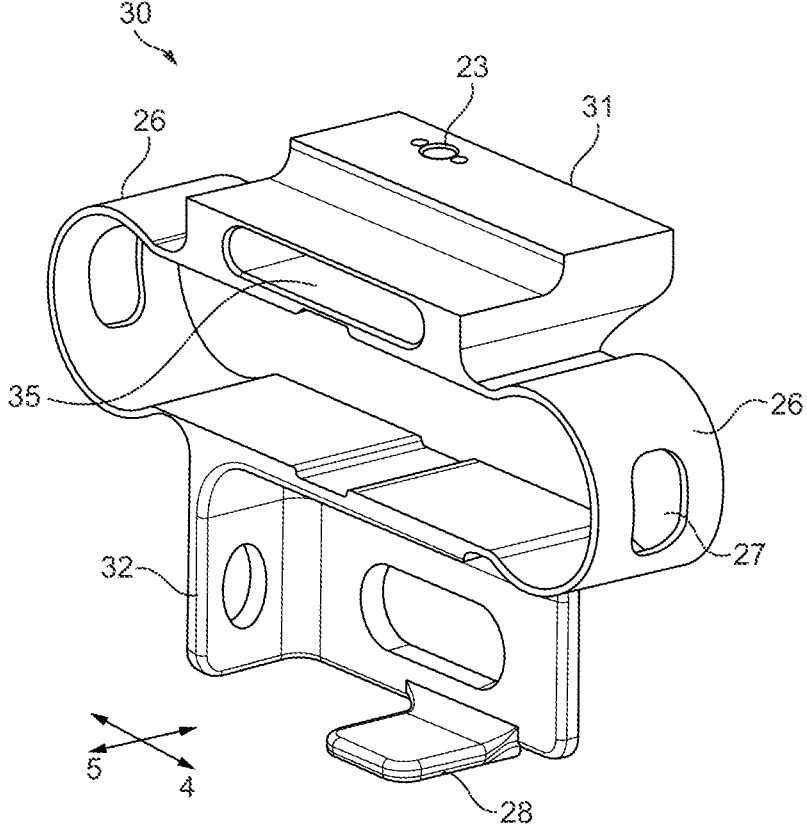
FIG. 5 shows a first probe holder part in accordance with an embodiment.

FIG. 5 shows the first probe holder part 30 of the probe holder 20 of FIG. 3 according to an embodiment.

The first probe holder part 30 may comprise an upper portion 31 connectable to the robotic arm, and a lower portion 32 arranged to support the probe 12. In an embodiment, the first probe holder part 30 comprises a pair of spring portions 26, spaced apart along the first axis. In an embodiment the spring portions 26 are c-shaped springs. In an embodiment, the curved section of at least one of the c-shaped springs comprises a cut-out portion 27. In an embodiment, the pair of c-shaped springs are arranged with the open sections of their respective c-shapes facing each other.

The upper portion 31 may comprise a connection hole 23 or other suitable means to allow the upper portion 31 of the first probe holder part 30 to be connected to a robotic arm, as described above. The lower portion 32 may be arranged to hold the probe in any suitable way, as described above.

The first probe holder part 30 may be integrally formed.

In embodiments, the first probe holder part 30 comprises a slot 35. In an embodiment, the upper portion 31 of the first probe holder part 30 comprises the slot 35, however, in other embodiments the slot 35 instead forms part of the lower portion 32 of the first probe holder part 30. The slot 35 allows the first probe holder part 30 to be stably and releasably joined to the second probe holder part 40, as will be discussed below.

Whilst the first probe holder part 30 has been described as part of probe holder 20 of FIG. 3, in some embodiments the first probe holder portion 30 may instead be a single, unitary probe holder. In such a case, the lower portion 32 may be arranged to hold the probe without the assistance of a second probe holder part 40, for example by being shaped to press-fit the probe into said lower portion 32.

Figure 6:
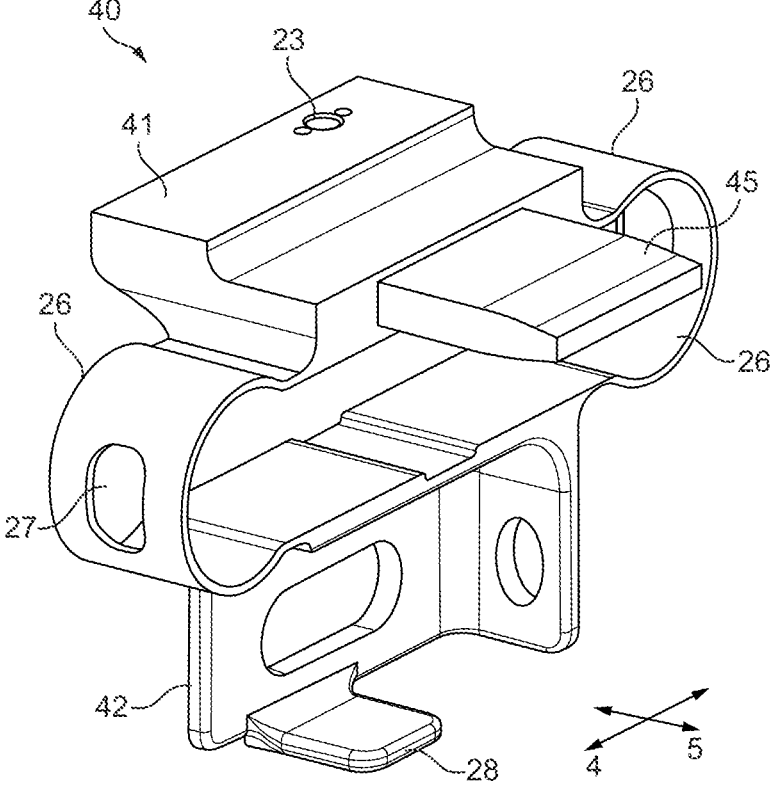
FIG. 6 shows a second probe holder part in accordance with an embodiment.

FIG. 6 shows the second probe holder part 40. The second probe holder part 40 is substantially the same as the first probe holder part 30, other than that the design is mirrored. However, in some embodiments, the second probe holder part 40 need not be a reflection of the first probe holder part 30.

The second probe holder part 40 may comprise an upper portion 41 connectable to the robotic arm 10, and a lower portion 42 arranged to support the probe 12. In an embodiment, the second probe holder part 40 comprises a pair of spring portions 26, spaced apart along the first axis. The pair of spring portions 26 may comprise a pair of c-shaped springs, arranged with the open sections of the respective c-shapes facing each other. The curved section of at least one of the c-shaped springs may comprise a cut-out portion 27.

The upper portion 41 may comprise a connection hole 23 or other suitable means to allow the upper portion 41 of the second probe holder part 40 to be connected to a robotic arm, as described above. The lower portion 42 may be arranged to hold the probe 12 in any suitable way, as described above.

The second probe holder part 40 may be integrally formed.

The second probe holder part 40 may comprise a connecting tab 45. The connecting tab 45 may be arranged to slide into the slot 35 of the first probe holder portion 30, thereby releasably joining the first and second probe holder parts. In another embodiment, the second probe holder part 40 comprises a slot 35, and a separate connecting tab 45 is insertable into the slots of both the first and second probe holder parts.

Figure 7:
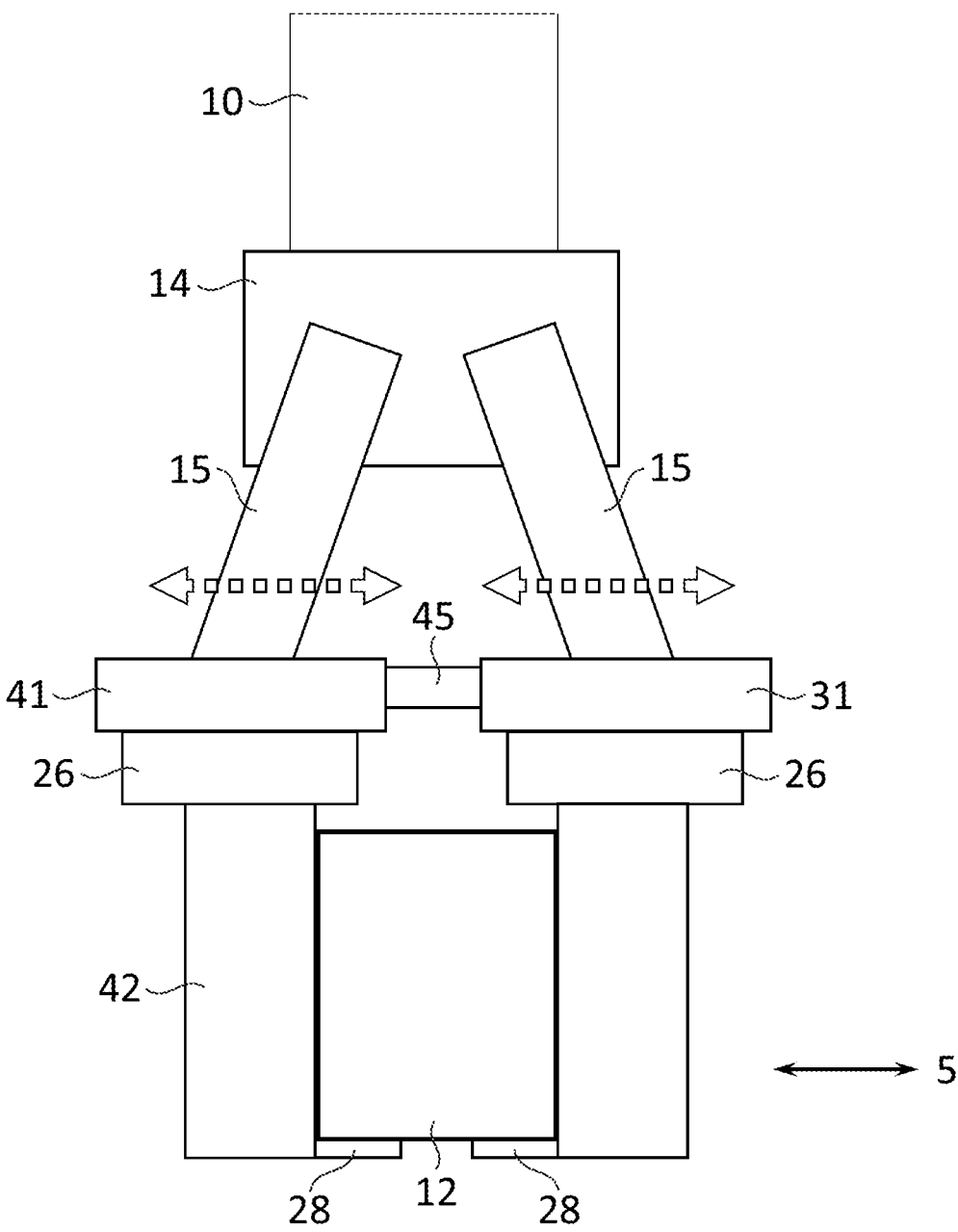
FIG. 7 shows a schematic of an apparatus including first and second probe holder parts in accordance with an embodiment.

The action of the first probe holder part 30 and the second probe holder part 40 in holding the probe in accordance with an embodiment is schematically illustrated in FIG. 7.

In FIG. 7, the probe holder 20 is mounted on the robotic arm 10. In an embodiment, the end of the robotic arm comprises an end effector 14. In embodiments the end effector is a "gripper", comprising at least two holding elements 15 that may be moved towards each other. In an embodiment, the first probe holder part 30 is removably connected to a first holding element 15, and the second probe holder part 40 is removably connected to a second holding element 15, such that when the first holding element 15 and the second holding element 15 of the end effector 14 are moved towards one another, the first and second probe holder parts are moved together to hold the probe 12.

When the first and second probe holder parts are moved towards one another, a connecting tab 45, for example and in an embodiment of the second probe holder part 40, is slid into a corresponding slot 35 of the first probe holder part 30. In embodiments, this provides a rigid connection between the first and second probe holder parts, for example between the upper portions thereof, thereby preventing relative motion between the (upper portions of) the first and second probe holder parts.

In this way, the first and second probe holder parts of the probe holder can easily be moved together or apart to hold or release a probe 12.

In embodiments, the support tabs 28, sit underneath the probe 12, thereby assisting with supporting the weight of the probe 12.

Various other arrangements would of course be possible. Thus, although the present embodiments have been described with reference to preferred embodiments, it will be understood by those skilled in the art that various changes in form and detail may be made without departing from the scope of the embodiments as set forth in the accompanying claims.

What is claimed is:

1. A probe holder for holding a probe during non-destructive testing of a component, the probe holder comprising:
    a spring assembly for biasing the probe in use towards a surface of a component to be tested to keep the probe in contact therewith, wherein the spring assembly comprises at least one pair of spring portions that are spaced apart along a first axis, the spring assembly configured such that in use when a probe held therein is moved over the surface of the component to be tested in a direction parallel to the first axis, the pair of spring portions that are spaced apart along the first axis maintain the probe in a certain orientation relative to the surface of a component to be tested, wherein the at least one pair of spring portions comprises a pair of c-shaped springs;

wherein the probe holder comprises a plurality of probe holder parts including a first probe holder part and a second probe holder part, wherein the first probe holder part and second probe holder part are configured to hold a probe for non-destructive testing therebetween in use, wherein the first probe holder part and second probe holder part are spaced apart in a second direction perpendicular to the first axis, wherein each of the first probe holder part and second probe holder part comprise a respective pair of spring portions spaced apart along the first axis, wherein each of the first probe holder part and second probe holder part comprises an upper portion for connection to a robotic arm and a lower portion arranged to support the probe, wherein the respective pairs of spring portions for each of the first probe holder part and second probe holder part connect between the respective upper portion and lower portion of the first probe holder part and second probe holder part, wherein each c-shaped spring of the pair of c-shaped springs comprise an open section and a curved section, and wherein the curved section of each c-shaped spring comprises a single curvature extending from the lower portion to the upper portion of the probe holder.

2. The probe holder of claim 1, wherein each of the first probe holder part and second probe holder part are integrally formed.

3. The probe holder of claim 1, wherein the curved section of at least one of the c-shaped springs further comprises a cut-out portion.

4. The probe holder of claim 1, wherein the probe holder is made from plastic.

5. The probe holder of claim 1, comprising a connecting tab that connects between the first probe holder part and second probe holder part, the connecting tab being provided by one of the first probe holder part and second probe holder part and designed to fit into a corresponding slot on the other of the first probe holder part and second probe holder part.

6. An apparatus for non-destructive testing of a component, the apparatus comprising:

a robotic arm;

the probe holder according to claim 1;

the probe connected to the robotic arm via the probe holder; and a controller configured to move the robotic arm to move the probe over a surface of a component to be tested.

7. The apparatus of claim 6, wherein the robotic arm comprises an end effector, wherein the end effector comprises a first holding element and a second holding element configured to be moveable towards one another, wherein the first probe holder part is removably connected to the first holding element and the second probe holder part is removably connected to the second holding element, such that when the first holding element and second holding element of the end effector are moved towards one another, the first probe holder part and second probe holder part are moved together to hold the probe.

* * * * *